United States Patent
Hasan et al.

(10) Patent No.: US 7,200,662 B2
(45) Date of Patent: Apr. 3, 2007

(54) INTEGRATED RULE NETWORK MANAGEMENT SYSTEM

(75) Inventors: Taqi Hasan, Fremont, CA (US); Elango Ganesan, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 713 days.

(21) Appl. No.: 10/190,036

(22) Filed: Jul. 5, 2002

(65) Prior Publication Data

US 2003/0110262 A1 Jun. 12, 2003

Related U.S. Application Data

(63) Continuation-in-part of application No. 09/900,482, filed on Jul. 6, 2001.

(51) Int. Cl.
*G06F 15/173* (2006.01)
(52) U.S. Cl. ..................... 709/226; 709/217; 709/220
(58) Field of Classification Search ................ 709/201, 709/203, 220, 221, 223–226, 227
See application file for complete search history.

(56) References Cited

U.S. PATENT DOCUMENTS

| | | | |
|---|---|---|---|
| 5,613,136 A | 3/1997 | Casavant et al. | |
| 5,721,855 A | 2/1998 | Hinton et al. | |
| 6,052,720 A | * 4/2000 | Traversat et al. | ........... 709/220 |
| 6,148,337 A | * 11/2000 | Estberg et al. | .............. 709/224 |

(Continued)

OTHER PUBLICATIONS

Papavassiliou, Symeon, "Network and Service Management for Wide-area Electronic Commerce Networks," International Journal of Network Management, John Wiley & Sons, Ltd., Mar. 2001, vol. 11, Issue 2, pp. 75-90.*

(Continued)

*Primary Examiner*—Bunjob Jaroenchonwanit
*Assistant Examiner*—Victor Lesniewski
(74) *Attorney, Agent, or Firm*—Shumaker & Sieffert, P.A.

(57) ABSTRACT

A network service administration system including a plurality of service objects, a plurality of address objects; and a service configuration application for a multifunction appliance running on a client computer coupled to the appliance via a network. The service configuration application includes an interface allowing subscribers to configure at least a subset of application content services provided by the appliance and including a rule set implementing rules in ones of said application content services in said subset based on changes to configurations of any other of said application content services. Each of said service objects may comprise an individual network service definition.

23 Claims, 10 Drawing Sheets

U.S. PATENT DOCUMENTS

| | | | |
|---|---|---|---|
| 6,163,544 A | 12/2000 | Andersson et al. | |
| 6,212,559 B1 | 4/2001 | Bixler et al. | |
| 6,223,260 B1 | 4/2001 | Gujral et al. | |
| 6,263,346 B1 | 7/2001 | Rodriquez | |
| 6,272,537 B1 | 8/2001 | Kekic et al. | |
| 6,374,329 B1 | 4/2002 | McKinney et al. | |
| 6,389,464 B1* | 5/2002 | Krishnamurthy et al. | 709/220 |
| 6,405,289 B1 | 6/2002 | Arimilli et al. | |
| 6,466,973 B2 | 10/2002 | Jaffe | |
| 6,477,572 B1 | 11/2002 | Elderton et al. | |
| 6,480,955 B1 | 11/2002 | DeKoning et al. | |
| 6,502,131 B1* | 12/2002 | Vaid et al. | 709/224 |
| 6,516,345 B1 | 2/2003 | Kracht | |
| 6,563,800 B1* | 5/2003 | Salo et al. | 370/264 |
| 6,662,221 B1* | 12/2003 | Gonda et al. | 709/223 |
| 6,681,232 B1* | 1/2004 | Sistanizadeh et al. | 709/226 |
| 6,738,908 B1* | 5/2004 | Bonn et al. | 709/225 |
| 6,934,745 B2* | 8/2005 | Krautkremer | 709/223 |
| 6,983,317 B1* | 1/2006 | Bishop et al. | 709/223 |
| 7,069,344 B2* | 6/2006 | Carolan et al. | 709/223 |
| 7,082,463 B1* | 7/2006 | Bradley et al. | 709/223 |
| 7,082,464 B2* | 7/2006 | Hasan et al. | 709/223 |
| 2001/0042190 A1 | 11/2001 | Tremblay et al. | |
| 2002/0007443 A1 | 1/2002 | Gharachorloo et al. | |
| 2002/0032725 A1 | 3/2002 | Araujo et al. | |
| 2005/0021713 A1* | 1/2005 | Dugan et al. | 709/223 |

OTHER PUBLICATIONS

Muller, Nathan, "Managing Service Level Agreements," International Journal of Network Management, John Wiley & Sons, Ltd., May 1999, vol. 9, Issue 3, pp. 155-166.*

Schmidt, Douglas, "A Family of Design Patterns For Flexibly Configuring Network Services in Distributed Systems," Proceedings of the Third International Conference on Configurable Distributed Systems, May 6-8, 1996, IEEE Press, pp. 124-135.*

Harmon, William "32-Bit Bus Master Ethernet Interface for the 68030 (Using the Macintosh SE/30)," Apr. 1993.

Troutman, Denise "DP83916EB-AT: High Performance AT Compatible Bus Master Ethernet Adapter Card," Nov. 1992.

* cited by examiner

INTEGRATED RULE NETWORK MANAGEMENT SYSTEM

This application is a continuation-in-part of application Ser. No. 09/900,482 entitled Network Management System, filed Jul. 6, 2001 Inventors Elango Gannesan, Taqi Hasan, Allen B. Rochkind, and Sagar Golla.

BACKGROUND OF THE INVENTION

1. Field of the Invention

The present invention is directed to management of network services in a data center, and in particular to management of services, subscribers, devices, log servers, and facilities using a common, virtualized management system.

2. Description of the Related Art

Public wide area networks such as the Internet have expanded the types of services used and demanded by enterprises of their network infrastructure. As the number, complexity and interaction of the services has risen, the associated costs of both the infrastructure itself and maintaining the infrastructure have risen as well. Many enterprises have turned to outsourced vendors, sometimes called a managed service provider or a data center, to provide these services in lieu of building and maintaining the infrastructure themselves. Customers of such managed service providers are called subscribers.

The managed service provider can operate in many different ways. Typically it can provide secure facilities where the infrastructure service equipment is located, and manage equipment for the subscriber. The scope of management and services is defined by an agreement with the customer calling for the managed service provider to solely or jointly manage the equipment with the subscriber. In other cases, the managed service provider can lease the physical space from another provider (called a hosting provider) and provide just the management of the infrastructure equipment on behalf of its subscribers.

A data center is a specialized facility that houses Web sites and provides data serving and other services for subscribers. The data center may contain a network operations center (NOC), which is a restricted access area containing automated systems that constantly monitor server activity, Web traffic, and network performance and report even very slight irregularities to administrators so that they can spot potential problems before they happen. A data center in its most simple form may consist of a single facility that hosts all of the infrastructure equipment. However, a more sophisticated data center is normally an organization spread throughout the world with subscriber support equipment located in various physical hosting facilities.

Data centers allow enterprises to provide a number of different types of services, including e-commerce services to customers; extranets and secure VPNs to employees and customers; firewall protection and Network Address Translation (NAT) services, web caching and load balancing services, as well as many others. These services can all be provided at an off-site facility in the data center without requiring the enterprise to maintain the facility itself.

The equipment that provides the infrastructure services for a set of subscribers can take several forms, depending on the implementation. Depending on the complexity and variety of services required, the equipment generally includes one or more single function devices dedicated to the subscriber. Generally, because the devices are designed with the co-location model in mind, service devices generally include the ability to provide only one or a small number of services via the device. Generally, typical multi-function devices combine services that are closely related, such as NAT and firewall services. A data center facility generally has a number of devices to manage, and in many cases the devices multiply as redundant devices may be used for fail over security to provide fault-tolerance or for load balancing.

FIG. 1 shows a typical single facility data center 20 and exemplary network architecture within the data center facility 20. It should be recognized that FIG. 1 is oversimplified for the purpose of showing the configuration of how such a data center facility is typically managed, and there are numerous additional components and devices in a data center facility not shown in FIG. 1. As shown therein, in one configuration, each subscriber has a leased physical cage—a cabinet of hardware which may include service provision devices and the subscriber's application servers as well as other specialized equipment for implementing the subscriber's service structure.

As shown therein, the data center facility 20 is coupled to a Wide Area Network (WAN) 50 via a high-speed interface device, such as an ATM switch 55. It will be recognized that the particular type of physical network to which the data center is coupled is merely illustrative and not germane to the presentation of the invention.

As illustrated in FIG. 1, the WAN may be a worldwide system of computer networks such as the Internet. Each ATM switch may be coupled to one or more level 2 and level 3 OCI layer switches 60, which direct traffic to any number of subscriber cages 22. Each subscriber cage may be leased by a particular subscriber of the data center, and may include equipment dedicated to servicing a particular subscriber. The subscriber may be, for example, an Internet business or company which seeks to offload its network operations to the data center. As shown in FIG. 1, each subscriber cage includes equipment from a different subscriber—"E-Client1.com", "E-Client2.com", etc. It should be understood that various forms of service models between the subscriber and the data center have been developed, and the particular form of business arrangement of a leased cage—sometimes referred to as "co-located" servers is illustrative only. Each cage is a physical rack of appliances dedicated to the particular subscriber and may be coupled to a network back plane and the application servers, which are maintained and configured by the subscriber in conjunction with the network operations center.

In general, in the typical data center case, the subscribers service equipment is designed with one subscriber in mind and hence, a data center providing outsourced management services to many subscribers must provide a separate set of infrastructure equipment for each subscriber. This equipment can come from many different vendors. The cages may include network appliances dedicated to one or more of the following tasks: routing, firewall, network address translation (NAT), SSL acceleration, virtual private networking, public key infrastructure (PKI), load balancing, Web caching, or the like. As a result, the management of all subscribers within the data center becomes very complex and expensive with many different management interfaces for all of the subscribers and subscriber devices. Administering the equipment in each cage is generally accomplished via an administrative access interface coupled to each single function device.

The difficulty in administering a data center as shown in FIG. 1 is that changes to each subscriber's individual configuration must be made at the cage, or at minimum, via appliance specific configuration mechanisms. Normally, subscribers themselves have no control over the service appliances and the data center administrators manage these appliances. As will be readily apparent, the more subscribers one has in the data center, the more resources must be committed to administration. This can become exceedingly difficult where changes must physically occur at the cage or via individual devices, especially in multi-facility data canters. In general, the data center will include one or more network operations centers, and one or more facilities operations centers. The network operations center generally refers to the facility which manages all physical facilities and the data center. The data center may have one or more physical facilities, each of which has its own facilities administrator who can have physical access to each of the cages. Hence, there can be at least two types of data center administrators depending on the organization of the data center. If the data center has all of its infrastructure equipment within a single facility, then there are only the personnel of that single facility acting as data center administrators. In larger data centers spread throughout the world, there is normally a central headquarters of the data center provider along with numerous separate data center facilities throughout the world. At the headquarters the data center may provide the capability to manage or monitor any device throughout the world that the data center is using to provide to its subscribers infrastructure services.

In order to alleviate some of these management problems, some virtual solutions have been developed, allowing administrators to configure devices via network interfaces. However, such devices do not administer services on an object level. That is, they do not allow the administrator access to administrative functions on a service level, but rather allow administrators to administer one or more particular types of devices via the device interface, by providing a common connection point for a number of devices in the data center. One example of such a solution is provided by Arula Systems corp. These devices allow an administrator to connect to a service device and through the administration device, manage a multitude of service devices.

Hence, such solutions are of limited scalability and scope.

SUMMARY OF THE INVENTION

The invention, roughly described, is a virtual management system for a network facility, such as a data center, or any facility having a plurality of components which can be organized as objects for presentation in a virtualized environment. Once organized into the virtualized management system of the present invention, management of the data center is streamlined and less user intensive.

Various aspects of the invention are described herein. In one aspect, the invention comprises a network service administration system. The system includes a plurality of service objects, a plurality of address objects; and a service configuration application for a multifunction appliance running on a client computer coupled to the appliance via a network. The service configuration application includes an interface allowing subscribers to configure at least a subset of application content services provided by the appliance and including a rule set implementing rules in ones of said application content services in said subset based on changes to configurations of any other of said application content services. Each of said service objects may comprise an individual network service definition.

In a further aspect, the content service application includes at least one of the following: Network address translation; virtual private networking; OSPF routing; Load balancing; or Firewall services.

In yet another aspect, the multifunction appliance is coupled to process data from a plurality of subscribers and said content application services are applied to subscriber data. In one aspect, the content services are applied only to individual subscriber data for which they are configured.

The invention may further comprise a rule based network administration system for a multi-function content service appliance serving at least one subscriber coupled to a network. In this aspect, the invention includes a service policy associated with said at least one subscriber; and a plurality of service definition objects. The invention includes a configuration engine including a plurality of content service application rule sets, each rule set installing one or more of said plurality service objects to provide a content service application such that said application and said rule set are compatible with said policy.

In a further aspect, the invention utilizes a plurality of address objects and the rule sets utilize said address objects in defining said content service applications. The address object may comprises at least one of: a system address, an address range, an address group, a network and a network range.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

The advantages of the present invention will appear more clearly from the following description in which the preferred embodiment of the invention has been set forth in conjunction with the drawings.

In the following detailed description, the present invention is described by using block diagrams to describe either the structure or the processing that implements the method of the present invention. Using this manner to present the present invention should not be construed as limiting of its scope. The present invention contemplates both methods and systems for implementing a network management system. In one embodiment, the system and method of the invention can be implemented on general-purpose computers. The currently disclosed system architecture may also be implemented with a number of special purpose systems.

Embodiments within the scope of the present invention also include articles of manufacture comprising program storage apparatus and having encoded therein program code. Such program storage apparatus can be any available media which can be accessed by a general purpose or special purpose computer. By way of example, and not limitation, such program storage apparatus can comprise RAM, ROM, EEPROM, CD-ROM or other optical disk storage, magnetic disk storage or other magnetic storage devices, or any other medium which can be used to store the desired program code and which can be accessed by a general purpose or special purpose computer. Combinations of any of the above are also included within the scope of such program storage apparatus.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

A virtualized data center management solution is disclosed herein. The invention is presented in multiple aspects and embodiments. In one aspect, the invention disclosed is a centralized management administration system with multiple subscribers. In this embodiment, each subscriber is managed as if the infrastructure equipment (each set of devices) were dedicated to an individual subscriber. In a further embodiment, all subscribers share common infrastructure equipment, and the management system segregates the management information to ensure security. The virtualized network management system allows multiple subscribers of a data center to be managed within a single integrated system.

Figure 1:
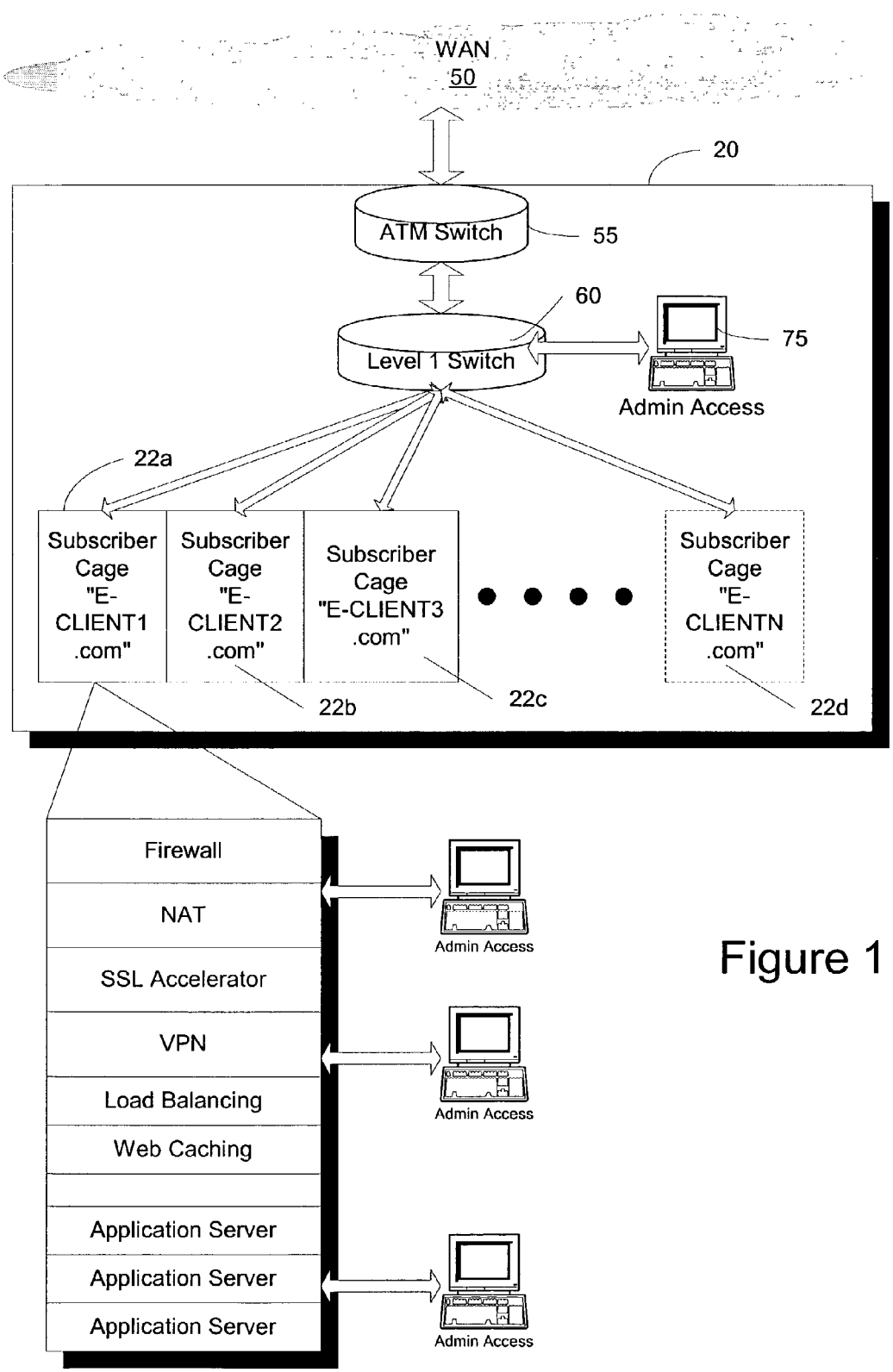
FIG. 1 depicts typical network architecture within a data center facility, including a subscriber cage having single function network appliances.
Figure 2:
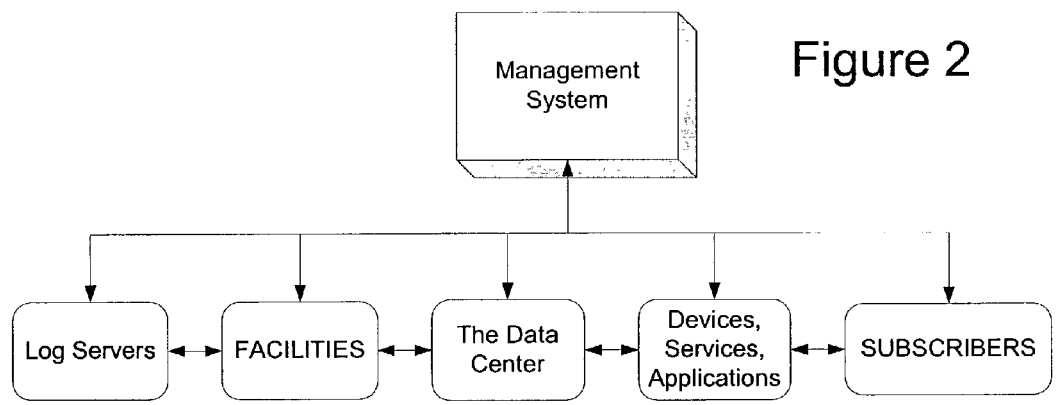
FIG. 2 depicts management of a data center facility using the virtual management system of the present invention.

In general, the management system of the present invention may be understood as an organization of data objects referred to as the virtualization topology, shown in FIG. 2. The virtualization is normally made visible to the management administrator via some management application, and the topology structure is supported by an appropriately configured database. Within the virtualization topology, objects are comprised of devices, subscribers, facilities, log servers and data centers.

Figure 3:
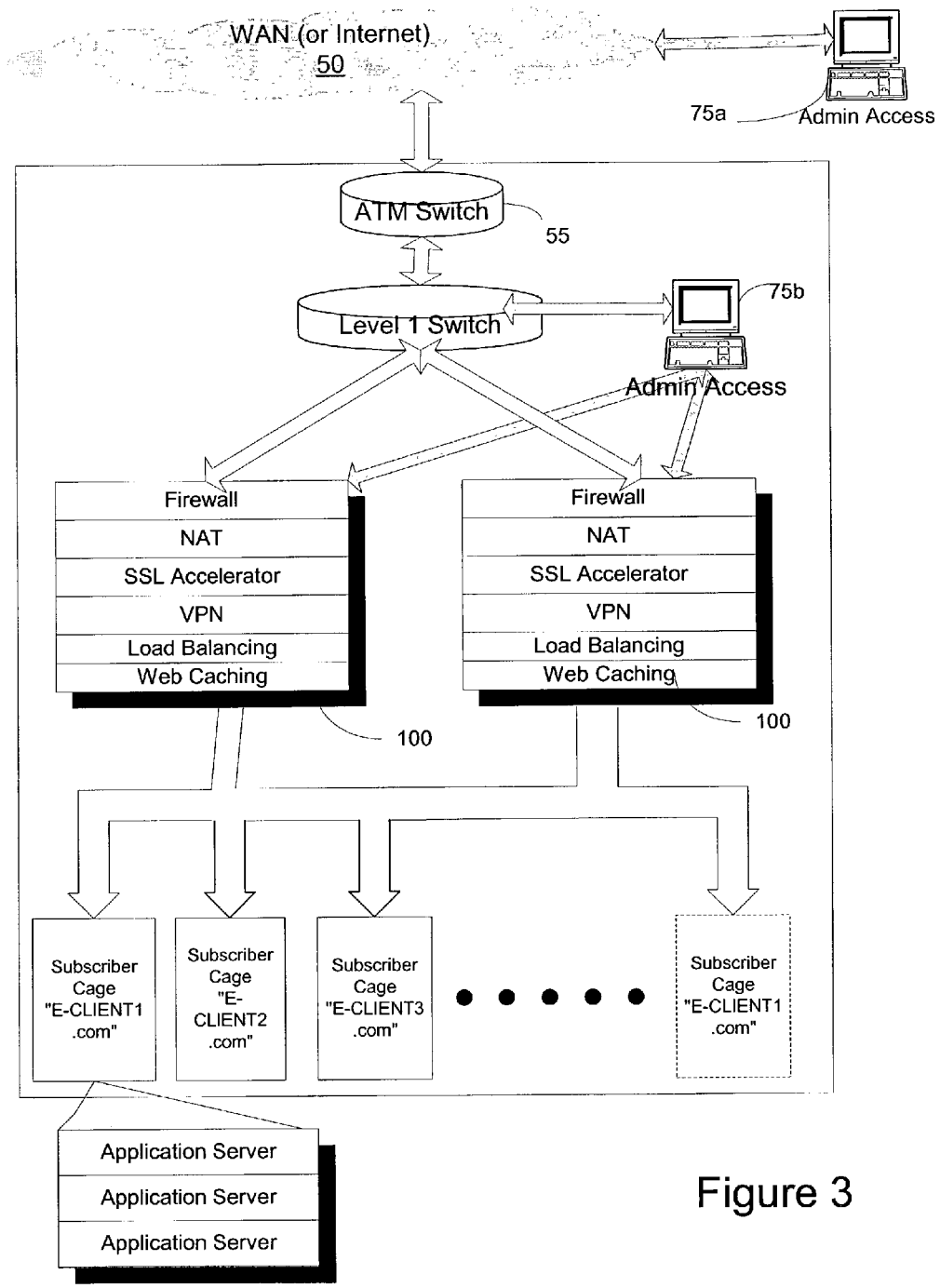
FIG. 3 depicts a management topology in accordance with the present invention.

FIG. 3 shows a network management architecture utilized with a virtual management system in accordance with the present invention. As shown therein, a single administrative access interface 75, such as a stand-alone administrative application running in a platform independent process, may be used to administer a multitude of services provided to subscribers. In the example shown in FIG. 3, multi-function service devices 100 capable of providing a multitude of services to the subscribers are managed by administrative access interface 75. As shown in FIG. 3, administrative access interface 75a provides access to the devices 100 via the Internet, or to the devices directly within the data center either within the physical facility via the secure network within the data center facility itself (75b). The multifunction devices 100 are coupled to the application servers and the network within each subscriber cage. The administrative access point may comprise a graphical user interface (GUI) or a command line interface (CLI), both of which are accessible through a multitude of applications.

It should be recognized that the virtual management system of the present invention need not be used with multifunction service devices 100, but could alternatively be used with devices providing a single or small number of functions. As will be described with respect to the system architecture set forth below in FIG. 4, when utilized with such multi-service appliances, the virtual management system of the present invention provides particular advantages in performance and administration. A multifunction appliance suitable for use with the virtual management system of the present invention is disclosed in co-pending U.S. patent application Ser. No. 60/303,354 entitled CONTENT SERVICE AGGREGATION SYSTEM, filed Jul. 6, 2001.

In the virtualized management system of the invention, a single system administrator can configure individual devices, log servers, or services for a subscriber, the facility, or for the entire data center, all via the interface 75. In the multifunction devices described with respect to co-pending application Ser. No. 60/303,354, the internal management approach is to segregate individual subscribers within the multifunction device to prohibit crossover services and avoid security problems within the device itself.

Figure 4:
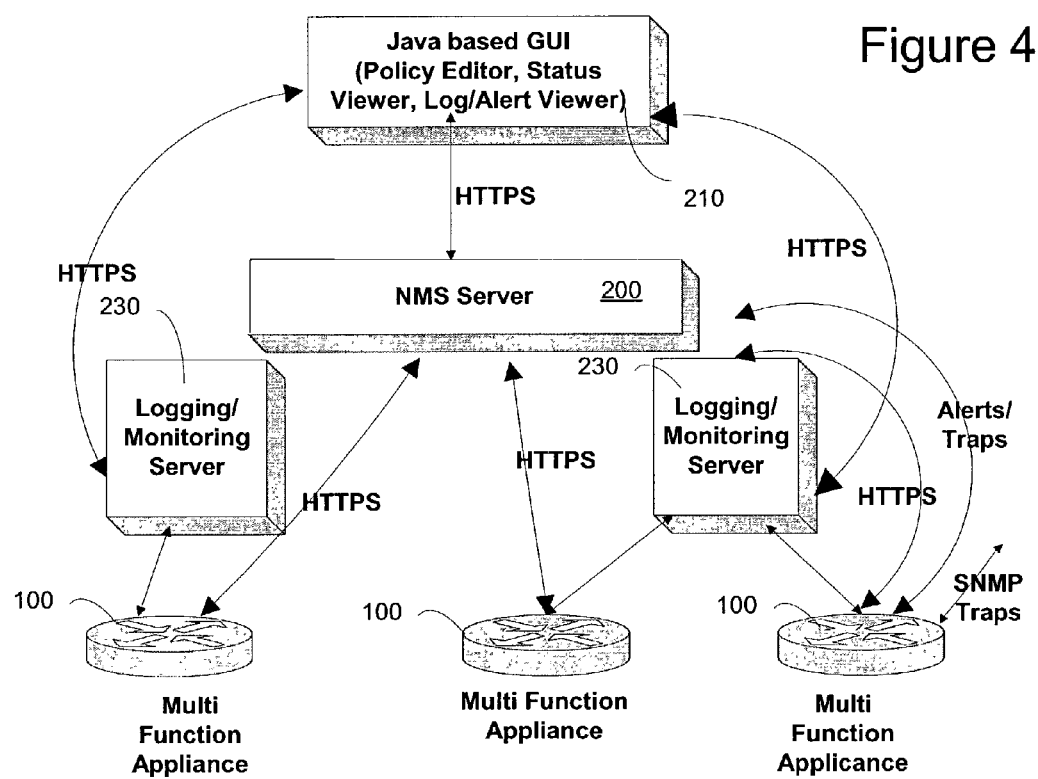
FIG. 4 depicts a system architecture implemented in accordance with one embodiment of the present invention.

An exemplary system architecture for implementing the virtual management system of the present invention is shown in FIG. 4. In this architecture, the multifunction appliance 100 is shown as being connected via a network to a network management server (NMS) 200. A secure network protocol HTTPS's may be used as the means of communication between the NMS and the multifunction appliances. The NMS can provide a graphical user interface to the administrative interface device 75 to allow a system administrator to configure appliances. A network graphical user interface 210 may comprise an application developed in a platform independent code to run in a browser application, such as Netscape 6.0 or Internet Explorer 4. or greater, 5.0 or greater, or a platform specific administration application running on a host device. It will be understood that the GUI may be delivered to the administrative interface device by any number of methods, including servlets, a network transmitted self-installation package, or provided on a machine-readable medium. All such embodiments of the administrative interface communicate with the NMS to provide changes to devices, services, administrative policies or the like, as described below.

In the example shown in FIG. 4, the GUI is a Java based graphical user interface that is provided by the management server via the network to a web browser using java servlets. The NMS GUI includes management applications such as a policy editor, a status editor, and a log/alert viewer.

Logging and monitoring servers 230 are provided in the data center to record events and traps from the multifunction appliance and provide standard format output reports to the administrator.

In a further aspect of the present invention, also described in further detail below, a subscriber may be allowed to administer all the services that are accorded to that particular subscriber by the data center. This further reduces the burden on the network operations center of configuring particular services for the subscriber.

In general, the NMS server 200 communicates with other components of the system via some secure protocol (e.g. HTTPs). (It should be recognized that within the data center, a secure network may be configured between the various components coupled to the NMS, so that HTTPs need not be required.) Network management server 200 receives and stores policies and configuration settings which are input using the user interface. The NMS 200 further includes policy databases and regulates access controls, network object definitions and security policies, as well as log server settings and reports. Using the GUI, an administrator can configure device and service configuration data and policy information. This information is stored in the network management server 200 and downloaded securely to each of the multifunction devices 100. In addition, the management server may include a network management back-plane application (or device agent) to allow for management applications to couple to the multi-function appliances 100. The NMS server can also perform certificate management, version control, and enforce access control to the devices.

In the foregoing description, the invention is described with respect to an embodiment wherein certain objects of the management system are described in detail as implemented using particular protocols or integrated into web-browser applications. It should be understood, however, that in the present invention, each component of the system—server, client, data center, facility, etc. represents an object and the invention is implemented to support the Common Object Request Broker Architecture (CORBA).

Administrative Interface

The GUI acts as a configuration input mechanism for the virtual management system of the present invention. Although the system will be described with respect to a particular implementation using a GUI, it will be understood that the functions performed by the GUI may be implemented using a command line interface (CLI) as well. In addition, it will be recognized that the NMS and the GUI may communicate via any direct, LAN, or WAN connection, or communicate via a collection of networks, such as the Internet.

Any of the topology objects, data center, subscribers, facilities, devices, or log servers can have new instances created via the GUI. Thus, for example, a new subscriber topology object is created when a new subscriber is added to the data center. Any number of copies of the GUI may be in operation at the subscriber company's administrative center, to manage that subscriber's portion of the data configuration policy.

Figure 5:
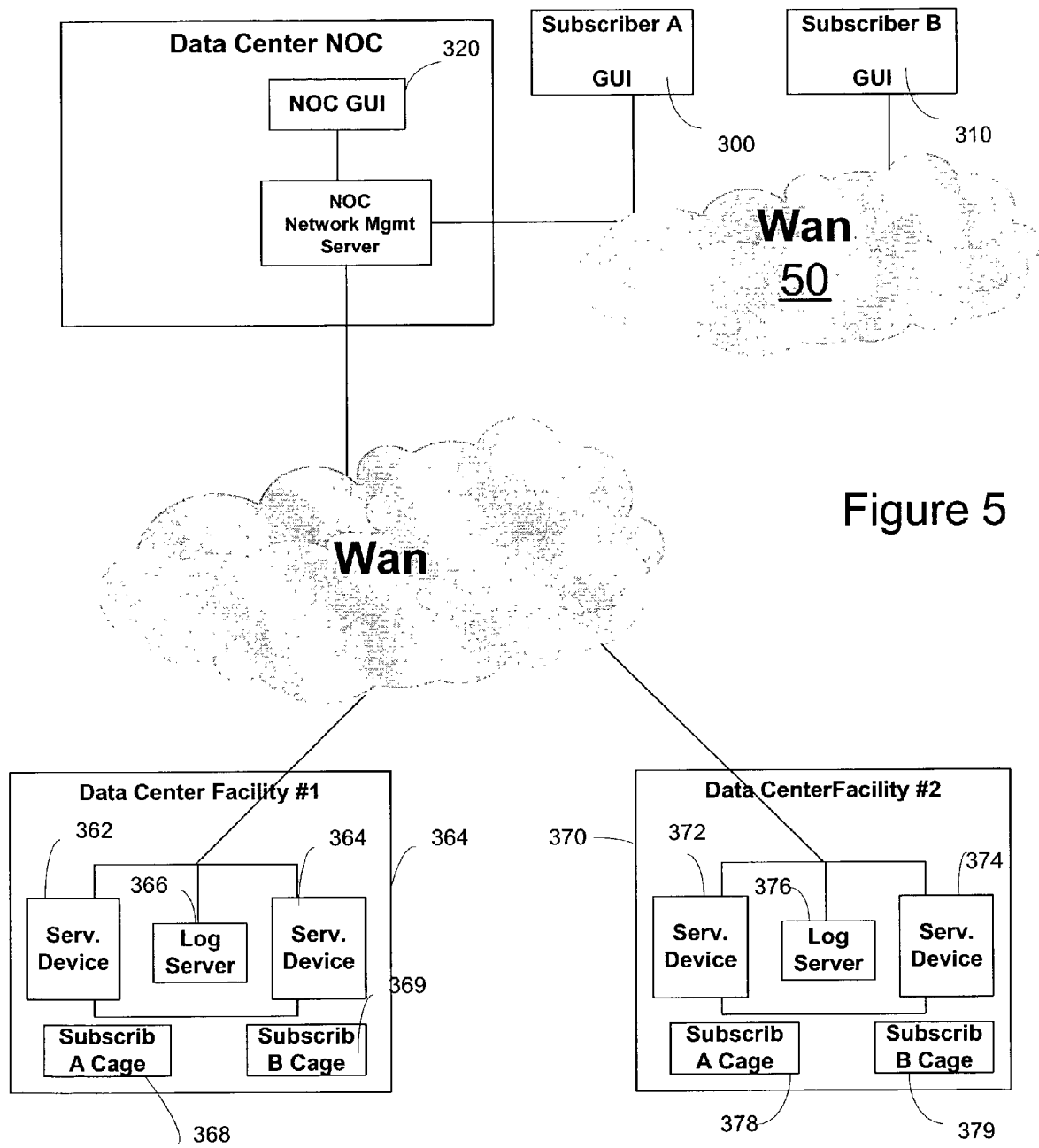
FIG. 5 is a depiction of system architecture for a multi-facility environment.

FIG. 5 shows a multi-facility, multi-subscriber embodiment of the system architecture of the virtual management system of the present invention. As shown therein, a series of subscribers, 300, 310, each of which has its own graphical user interface, couples via a WAN 60 to a network operations center 350. Network operations center 350 includes its own version of the graphical user interface 320 for access by the NOC or facilities administrator who may be physically present in the NOC. All three interfaces are coupled to the network operations center's network management server 200a. The data center network operations center facility 350 may include its own subscriber equipment, but in the example shown in FIG. 5, separate data center facilities 360 and 370 each include a plurality of subscriber cages 368, 369, 378, 379, and multifunction devices 362, 364, 372, 374. In data facility 360, two multifunction devices 362, 364, coupled in a redundant fashion allow for failsafe rollover between the devices in the event there is a hardware failure in one of the devices. Each of the devices 362, 364 is coupled to one or more subscriber cages 368, 369, as well as a log server 366. A similar configuration exists in date center facility 370. Facilities 360 and 370 are coupled via a WAN 70 to the network operations center 350. In this embodiment, a single network management server 200a is utilized. It should be recognized that the network management server 200 may actually comprise one or more physical servers configured as a single virtual management server. It should be further understood that the WAN's 60, 70 may comprise public WANs, secure networks, or a series of interconnected networks, such as the Internet.

Using the GUI, the management administrator perceives the virtualization topology through a set of views. As used herein, a "view" is a hierarchical layout of the data center, its facilities, subscriber, devices and/or log servers. A view is normally shown as the familiar tree structure, with the root being the data center, and the branches being the facilities, subscribers, devices and log servers. It will be recognized that other GUI representations other than the tree structure may be incorporated into the system of the present invention without departing from the scope and character of the invention.

Each view can have varying depths showing levels of granularity in the data center configuration. When an object is selected, various management capabilities can be performed on the object. The properties of the object can be viewed or edited. Each object like data center, facility, subscriber, device, or log server has a set of properties that can be managed via the interface. One example of an object property is the name property. Other properties are dependent on the type of management object. For example, a subscriber object may have a list of infrastructure services that the subscriber has contracted with the data center. As discussed in further detail below, the system incorporates a privilege-based model of administrator access, with each level of privilege providing a more fine grain access of what services can be managed. As such, views and levels of views may be prohibited to certain levels of administrators based on that administrative user's policy definition.

Exemplary GUI views are shown in FIGS. 6a–6e.

Figure 6A:
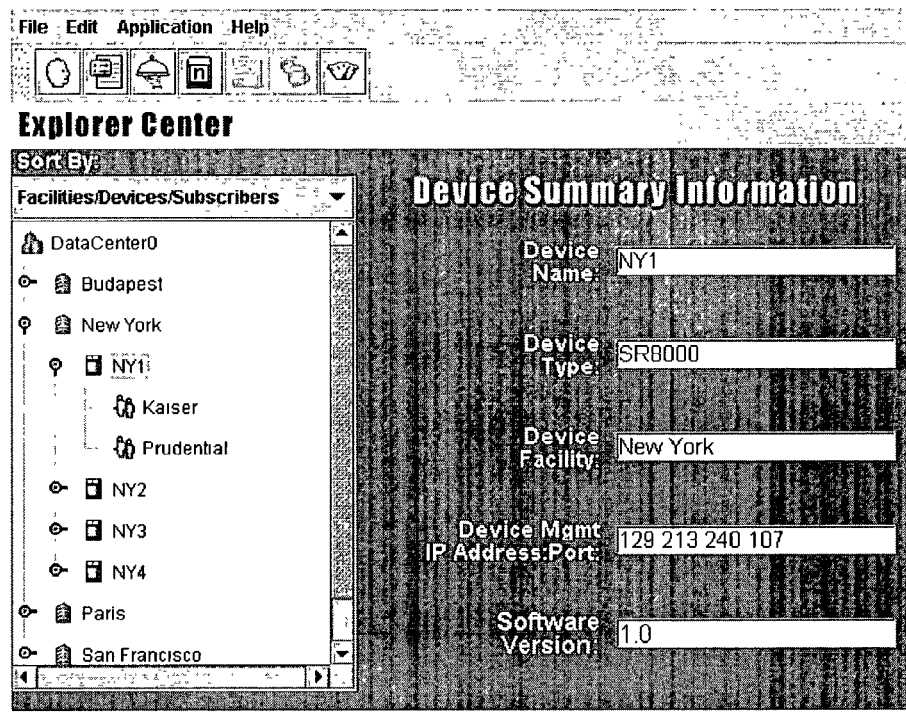
FIGS. 6A–6E are depictions of graphical user interface views utilized in the system of the present invention.

FIGS. 6a–6d are views available to global or NOC administrator. FIG. 6a shows a global data center view sorted by facilities/devices and subscribers. At this level, an administrator can view all facilities, the devices shown in those facilities (as shown in FIG. 6a), and the subscribers served in those facilities. In addition to viewing devices and services in the facility, this view allows definition of application access control privileges, the definition to the application of the data center NOC and facilities, specification of what multi-function devices reside in what data center facility, and policy database attributes. This level allows the administrator to define such things as descriptive and naming information for NOC and the facilities. Other device specifications can include mappings of device IP addresses to devices in a specific facility, or mappings of IP addresses to the various subscribers and subscriber service bundles. This view may also indicate how many devices reside in each data center facility, and how these devices will be used for fail over or load balancing.

FIG. 6a allows the configuration or viewing of attributes related to a specific device within a single data center facility regardless of the subscribers, whose traffic is being supported or services provided to the subscribers. Some examples include boot device commands and download of specific device configurations. FIG. 6a also indicates how many devices reside in the data center facility and how these devices will be used, say, for failover or multiple device load balancing.

Figure 6B:
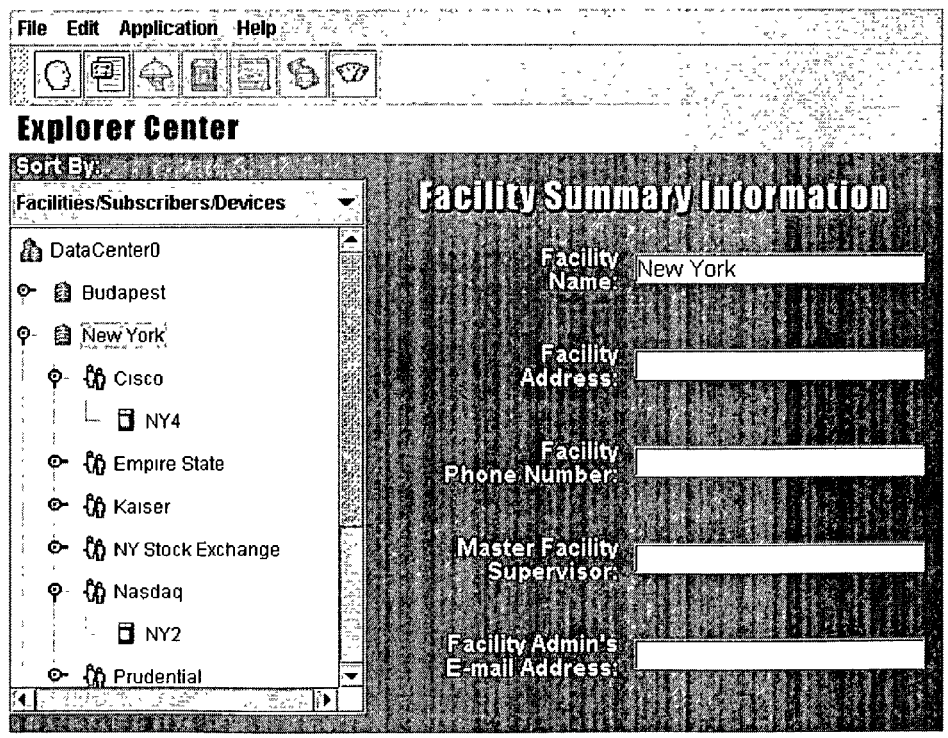

FIG. 6b shows a view with a subscriber/facilities/device filtering allowing policies and device services to be configured for one subscriber independent of the other subscribers and for all devices (if, e.g. in multiple data center facilities) supporting that subscriber. An administrator having subscriber privileges has access only to the view of FIG. 6b and only for that subscriber. Within this view the services sets and specific services to be provided for each set are specified and the policies and configurations for each of these services are specified.

Figure 6C:
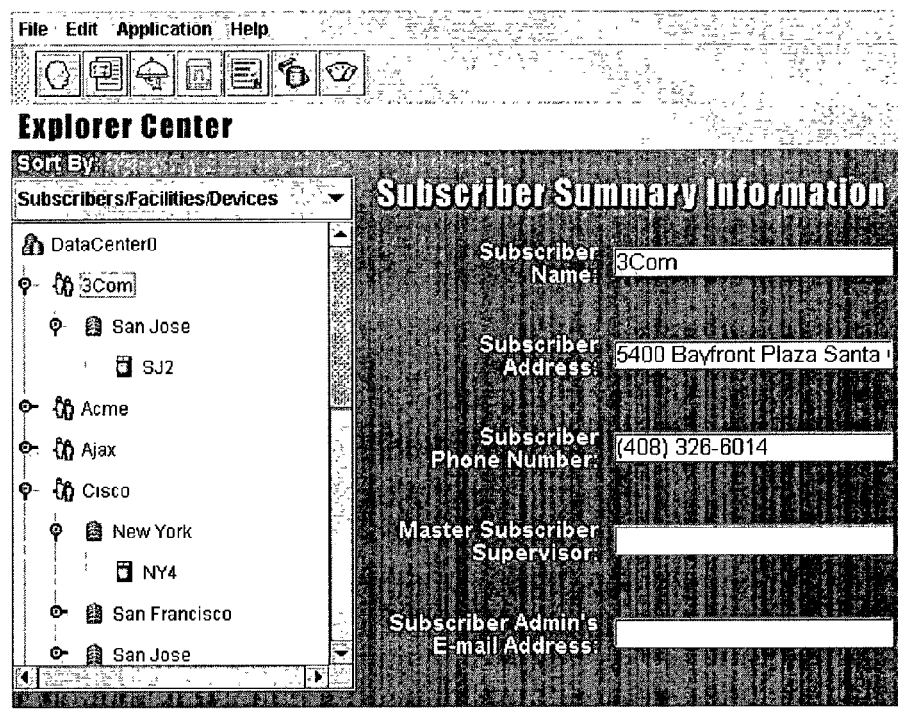

FIG. 6c shows facilities and devices in the facility by subscriber (subscriber/facilities/device filtering), presenting those facilities and devices supporting individual subscribers. Again, appropriate access privileges allow an administrator to configure various aspects of each object.

Figure 6D:
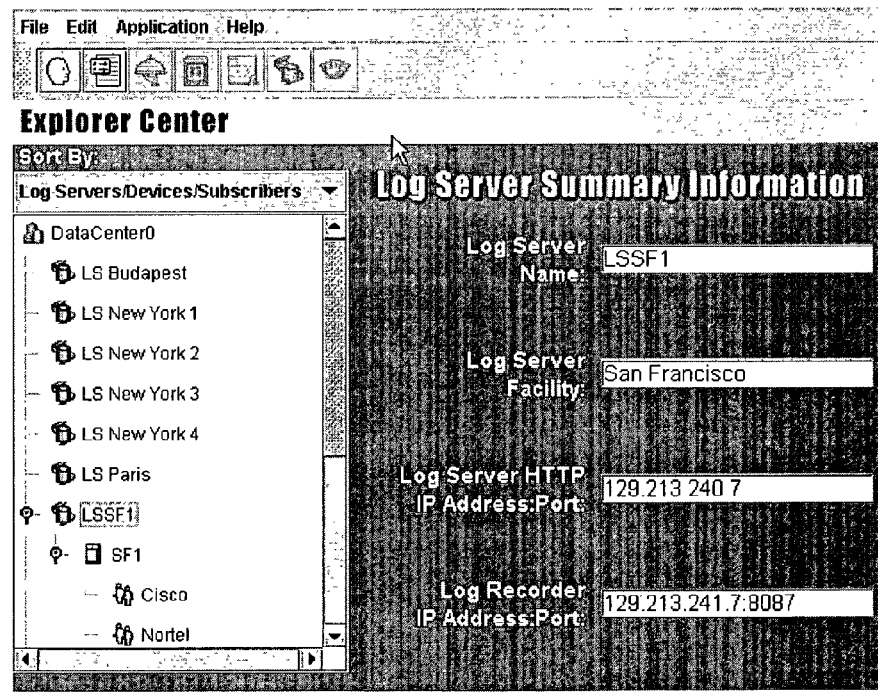

FIG. 6d shows a view with a log server/device/subscriber filtering. These views are generally shown to a facility administrator who may be physically present in one data center facility.

Figure 6E:
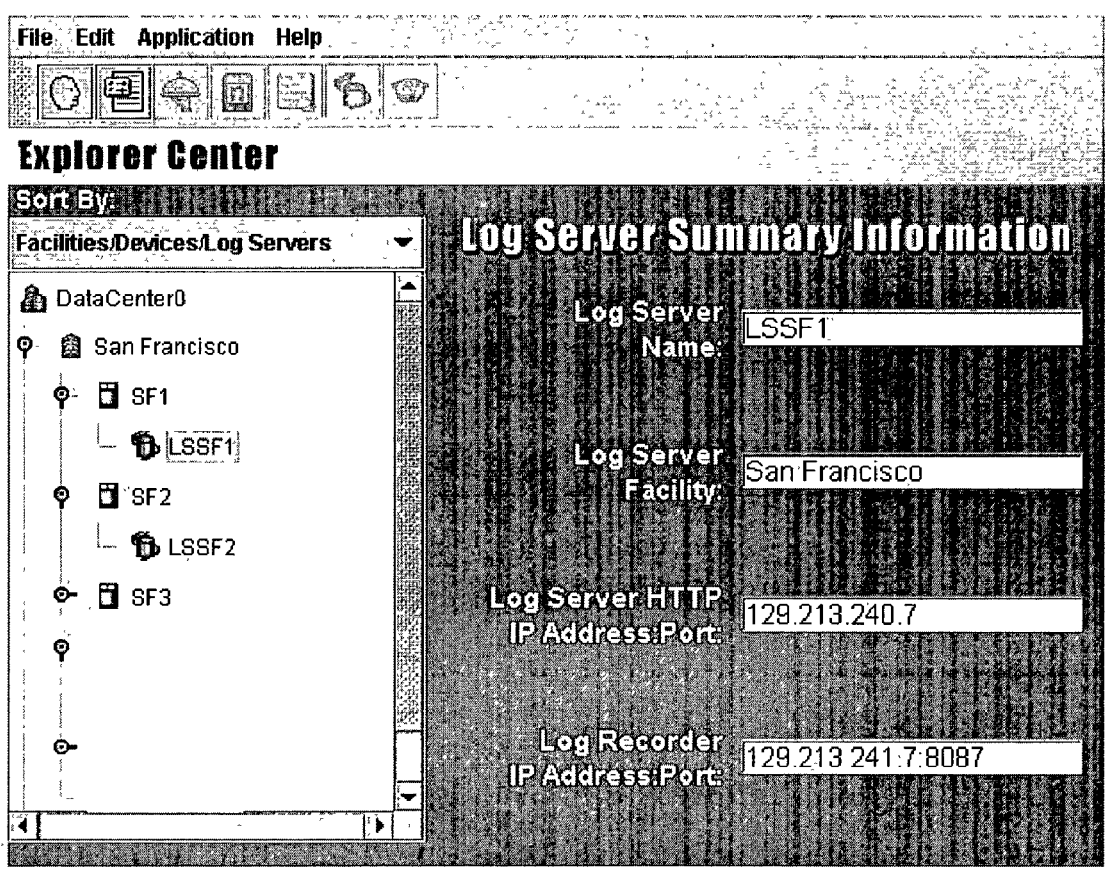

Finally, FIG. 6e shows how a facilities administrator has a limited view. In this example, the facility administrator sees only log servers for the San Francisco.

One view, which may be a sub-view of the subscriber view and which is not shown in the Figures, is the service bundle view. This view allows a single subscriber to manage multiple sets of services. For each subscriber there is only one service bundle per data center facility. However, if a subscriber occupies more than one facility, then it will have more than one service bundle associated with it. The policies and configurations for a specific service bundle configured for the subscriber are specified on a service-by-service basis (e.g. routing, firewall, NAT, VPN, PKI). If a public key certificate represents a subscriber's service bundle, then PKI for that service bundle is configured here.

Numerous other types of views are possible. For example the following two level views are possible:

| ROOT | BRANCH | BRANCH |
| --- | --- | --- |
| Data Center | Subscribers | Facilities (FIG. 6c), or devices |
| Data center | Facilities | Subscribers (FIG. 6b), devices (FIG. 6a), or log servers (FIG. 6d) |
| Data Center | Log Servers | Subscribers or Devices |
| Data center | Devices | Subscribers or log servers |

The following three level views are possible:

| ROOT | BRANCH | BRANCH | BRANCH |
| --- | --- | --- | --- |
| Data Center | Subscribers | Facilities | Devices |
| Data Center | Facilities | Subscribers | Devices |
| Data center | Facilities | Devices | Subscribers |
| Data center | Facilities | Devices | Log Servers |
| Data center | Facilities | Log Servers | Devices |
| Data center | Log Servers | Devices | Subscribers |

As will be readily apparent, numerous levels and varieties of object views are possible. Views with a depth of four levels are possible. For example, under the data center we list the facilities. For each facility, we list the log servers. For each log server, we list the devices that can log to the log server. At the fourth level for each device we list those subscribers on the device that can log to the specified log server.

It should be further recognized that in the aforementioned examples, the root level may comprise the facility (to a facility administrator), or a subscriber (to a subscriber administrator), rather than the data center view (shown to the NOC administrator). The root of the tree view can depend on the level of access granted to the administrator utilizing the application.

Some examples of how the user interface may be used are as follows. When the application is started for the first time, configuration data needs to be entered by the NOC administrator. A selection of a particular item in the tree view—for example by double clicking on a subscriber, can bring up the Read/Modify dialog for the subscriber. Similar operations are used for facilities, devices and services. This allows the selected object's definition information to be viewed in more detail and if access privileges permit, that information can be changed.

If one of the applications in the "Applications" menu is clicked, then that application is brought up for the particular object. E.g. if the "Services" application is clicked in the menu, then a subscriber's service configuration/policy editor is brought up. Views may be changed using the view menu command structure In some cases, it may not make sense to show views and submenus. If a facility is selected, the "Services" application menu option is not accessible (being subscriber oriented only). However, the "Logging" and "Status" applications are accessible, giving logging, alerting, and statistics information for the facility.

The "New" menu items permit configuring new facilities, data centers, devices and subscribers by an appropriately permission administrator. The Edit menu item allows modification of the data objects. The View option allows the user to change the particular "view by . . . " options.

The applications menu contains the non-administrative applications: "Services", "Logging", "Status". The "Services" item is active only if a subscriber or device is the current selected object. In that case, clicking on "Services" brings up the service policy/configuration application. "Logging" brings up the log event application, which reports log events and alerts within the scope of the object selected in the component tree pane. E.g. if a subscriber is selected in the component tree pane, then log events/alerts for only that subscriber are displayed by the application. If a data center facility is selected, then the logging application presents all events/alerts coming only from that data center facility. The "Status" application displays statistics tables (and possibly dynamic graphs of selected statistics parameters) within the scope of the object selected in the component tree pane.

The GUI operates similarly for all levels of administrators, but different permissions with respect to reviewing and changing items in each view are allowed, as well as limited views based on authority.

For example, the subscriber administrator may only have the facilities by subscriber view except only the subscriber's own hosting data center facilities are shown. The "Subscribers By Facility" and "Devices By Facility" views are not shown.

System Architecture Components

Figure 7:
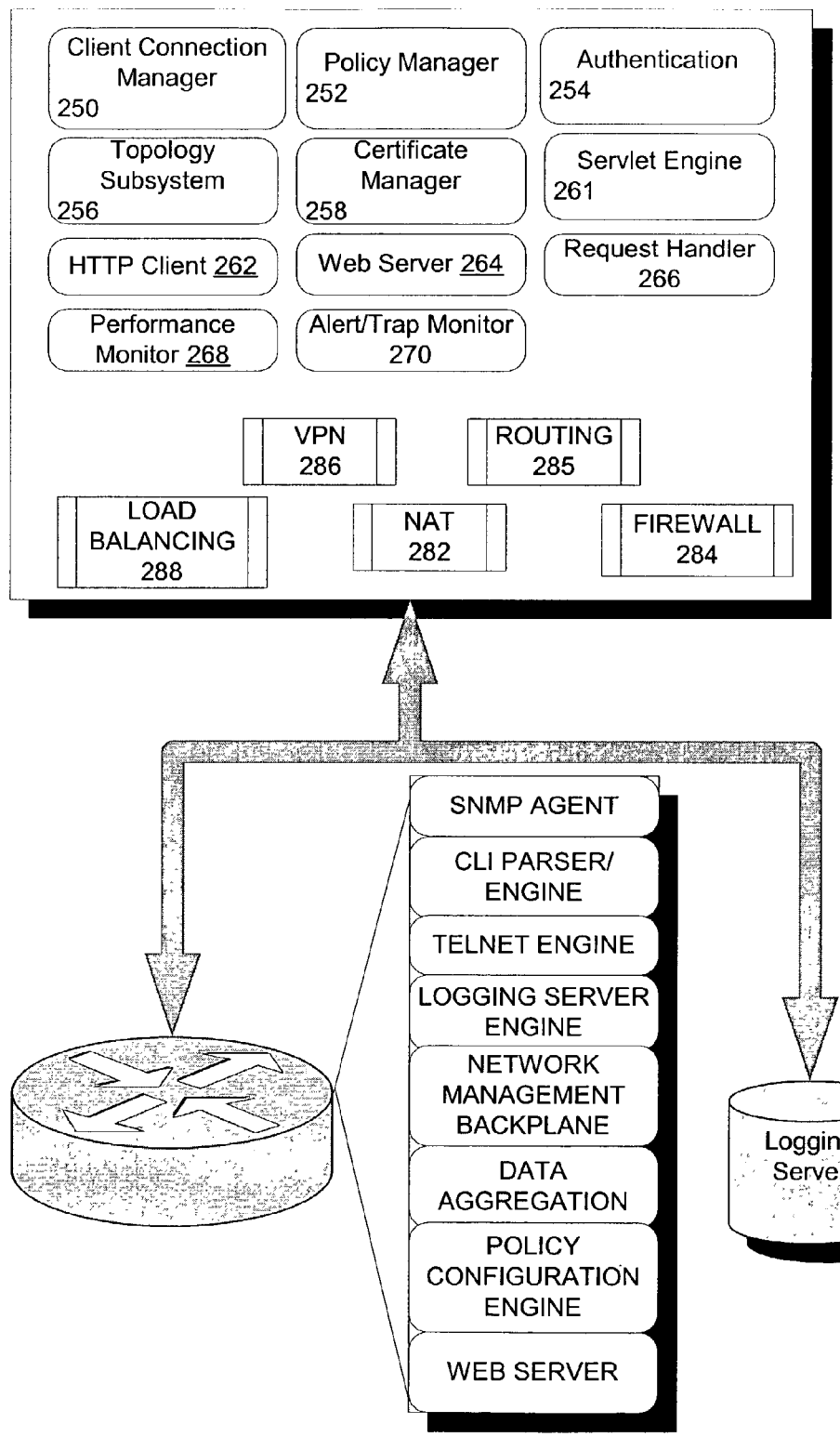
FIG. 7 is a depiction of the modules running on the network management server, and the management server agent for interacting with service appliance devices in one embodiment of the system of the present invention.

FIG. 7 shows the components of network management server 200. Each network management server may include any number of applications which are designed to interact with the multifunction appliances 100 and logging servers 200 via the graphical user interface as set forth above.

Each network management server provides a number of service modules which may include, for example, a client connection manager module 250, a policy manager module 252, an authentication module 254, a topology subsystem 256, a certificate manager 258, a Servlet engine 261, an HTTP client 262, a web server 264, a request handler 266, a performance monitor 268 and an alert/trap monitor 270. Each of these service modules communicates with a network management back plane application 260 in the device to configure device functions and report on device operations. It should be recognized that while the service modules are illustrated in the context of being a part of the NMS server, all or a portion of the modules may be incorporated into the user command interface, such as the GUI, which is uploaded to the administrative interface client. This allows for the distribution of the processing load of the virtual management system. In addition, other service modules may be incorporated into the management server, as needed allowing for maximum flexibility in scaling the virtual management system as new services, devices or functions are required.

The network management server 200 may also serve as a content services application server, hosting a plurality of content services applications. As shown in FIG. 7, these content services applications can include a OSPF/RIP router 285, Network address Translation (NAT) 282, Firewall 284, VPN/IPSEC with IKE and PKI 286, and Bandwidth Management/QOS 288. It will be recognized that other service applications may be provided as necessary given the types of services required by the subscriber and provided by the service devices 100 in the data center.

The system management of infrastructure services (like firewall, NAT, VPN, QOS, web caching, web load balancing, SSL acceleration, etc.) for multiple subscribers is normally performed via an infrastructure service applications or Content Services Applications. Because all of these infrastructure services for all of the subscribers are running on a single virtualized management system, each content services application can be centrally launched for each selected subscriber. When an application is launched for that subscriber, the application runs only in that subscriber context. That is, any application such as, for example, the "services application, is created only for that subscriber and all configuration data pertaining to that subscriber is available in only that subscriber's context. The management information (which could be configuration or policy information) generated by this application applies only to that subscriber.

The virtual management system incorporates a content management server (in this case the Network management server) which hosts the management services for subscribers supported by a data center. These services are accessible to subscribers through a single external URL. The NMS can transparently switch to service that was specific to a subscriber. There could be several log servers that are used by a subscriber, at a given time, in a given deployment configuration. Based on the context, the NMS directs the incoming connection to the appropriate log/web server securely. These server process resources are transparent to the end-user. This process is called Intelligent Switching and results in ease of use, higher performance and better scalability, allowing the data center to scale with subscribers, as the demand for hosting services grows.

Other service applications can be run for each subscriber. For example, a virtualized management system may supply a log view reporting application for each subscriber. The various logged events from the log servers are reported to this application, but only for the selected subscriber. Another service application could be a status reporting application. Alerts generated on behalf of the subscriber can be displayed in this status service application. Similarly network or security management statistics can be displayed for that subscriber by the status viewing service application. If an infrastructure service like VPN or SSL acceleration requires digital certificates, then the certificate management application (described below) can be launched for each subscriber to provide the certificates required by the infrastructure service.

In addition to launching service applications in the subscriber context, other service applications may be launched in a device context. For example the physical configuration of the device (e.g. setting port addresses) can be performed for each device in the data center. This device configuration application is centrally launched for the selected device virtualization topology object. The log view and status view service applications might also be launched in a device context. They would display logs and status information that emanated only from the selected device.

Similarly, service applications may be launched in a log server context. For example, the log viewer application launched in this context would show log events coming only from the selected log server.

Still further, service applications can be launched in the global data center context. For example certificate management in the data center context could be used to generate certificates for all the components of the network management system to provide secure network communication for network management transactions. The log view and status view service applications can be launched in the data center context and log events and status information from every device in the data center could be displayed.

A service application can be launched in any number of topology object contexts. Nevertheless, it would not make sense to launch certain types of applications in certain contexts (such as, for example, launching a certificate management application in a facility context). The service applications that can be launched may not necessarily be those mentioned explicitly above; it can be any application that makes sense in the specified topology object context The management service modules interact with the content services applications to provide the aforementioned service management. The Client Connection Manager 250 regulates the number of connections between management client and network management server 200. It handles such actions as: sign on requests; requests for subscriber policies; requests for policy installations; requests to create an administrator; requests for device information; requests to change device information in the network management server database; requests for VPN policy information; requests to create new subscribers; requests to change subscriber information and requests to add new device information to the network management server database. A request/response mechanism is used via the embedded Web Server and use a secure protocol (e.g. HTTP) to establish a session to initiate different requests.

The policy management application 252 enforces subscriber level access control policies to maintain the data integrity and validates policies installed. Before the rules are installed, they are checked for integrity and for any possible security holes in a rule base, as well as to determine whether there is any conflict in any of the other service application rules. The policy management application can retrieve rules on a subscriber basis. This application also handles definition of VPN policies and command line interface definitions of router configurations.

The authentication manager 254 provides access control and regulated administrative privileges. Access to the module may be password encrypted and implements the security scheme set forth below.

The topology subsystem 256 maintains the relationship between objects in the virtual management system. Topology information is stored as a table in topology database file.

The certificate manager 258 is a centralized public key infrastructure (PKI) manager for each subscriber. It interacts with multiple certificate authorities and their databases for enrollment and certificate download/renewal and key management.

The servlet engine 261 provides mapping of administrator comments into servlets and interfaces to access http structures to which configuration results transmitted to the devices 100 can be written.

The client 262 is utilized with the back plane application 260 to communicate with the devices and supports GET and POST http methods required for the back plane, as set forth below. It should be recognized that the invention described herein could be utilized with non-HTTP based protocol clients, and non-web-browser enabled clients.

The embedded web server 264 is utilized to respond to HTTP requests from browsers to establish communication sessions with administrative interfaces 75 which may be, for example, utilizing a web browser to retrieve the GUI to administer the data center.

The request handler 266 is implemented as servlets which store data to respond to requests from the application modules. For example the policy handler would serve a policy request based on the access control context established during the logon. Policy information is stored in XML format and the request handler enforces concurrency control and uses the servlet engine to store data.

The performance monitor 268 is supported through the query interface on predefined attributes. One may also set up a polling interval to query attribute values through the GUI.

The alert/traps module 270 stores system critical information received by the NMS server via a secure protocol from the devices 100. The module then updates an alert viewer in the user interface in real time. The alert viewer can also be used to fetch this information from the NMS using HTTP requests.

Each service provided by the multifunction service devices include manageable elements represented by data structures tailored to the functional and performance requirements of that service. The management back plane 260 maps service specific data structures and the transfer syntaxes supported for network management interactions between the device and the management server. In one embodiment, a "management back plane" tool such as Rapid Logic's RapidControl™ Backplane available from Wind River Systems, Inc. is used to perform those mappings. Alternatively, all manageable elements may be mapped to a SNMP management information base.

The network management back plane application 260 may include facilities for communicating with the network components of the invention including an SNMP agent 262, a CLI parser/engine 264, a Telnet engine 268, a network management engine 272, a policy configuration engine 276, and an embedded Web server 278. Each of the back plane components converts communications from the service applications of the network management server 200 to the communication required for the multifunction service appliances 100, and interprets responses from the multifunction appliances 100 and logging servers 230. The management back plane further allows for third party management and reporting applications to interact with the network management server to present information on configuration of the system as well as logging ports via a third party standard formats.

The SNMP agent 242 is primarily used for monitoring the overall health and basic functionality of the multifunction appliance through a third party network management application. (One example of such an application is HP Openview available from the Hewlett-Packard Company). Various counters and statistics are supported for each service enabled in addition to relevant management information base data. SNMP Traps will also be supported for the Network Management application.

The CLI/Parser Engine 244 is called when input to the device is received through a telnet session, or by a serial input through an out-of-band port on the multifunction device 100. Once a request comes in, a lookup is performed on the request and matched to a database linking the requests to an operations code in one of the manager applications. When the CLI Engine receives the data, it packages it back as a response to the appropriate application session.

The telnet server 246 allows command line interface interaction with the management server and mimics the same functionality as a serial connection to the multifunction device, set forth above.

The log server engine establishes a TCP/IP session with the log server to continuously send logging events to the log server through a secure channel. Alerts are also sent to the logging server through this channel.

Data aggregation engine 274 provides for data aggregation through an IPC mechanism in the multifunction device and is responsible for sending requests to various services in the device for statistics and general data collected at each service. Essentially the IPC does a lookup and dispatches requests based on the results of this lookup.

The policy configuration engine 276 uses a policy string or set of strings that mimics well-known or commercially utilized policies for services such as firewalls which are sent to the multifunction device for VPN and Firewall policies. The engine takes incoming configuration, parses it and hands it off to the IPC mechanism. The configuration request and parameters are then sent to the appropriate service (which will configure its individual parameters).

The embedded web server is used in communicating to the Network Management Server. The device receives configuration information through HTTP over SSL in XML format. Again, these are parsed by the Policy Configuration Engine and dispatched across the multifunction device.

The network management back plane is a component of the back plane application used for managing the device 100 and server 200 interaction mappings. In the embodiment utilizing the aforementioned commercial back plane management application, the system includes markers and pointers to allow the application to efficiently control system interactions. It should be understood that some form of internal application management structure may be utilized in accordance with the present invention, and the particular type of management structure is not relevant to the scope and content of the present invention.

To increase the usability of the network management system a set of reporting facilities is provided. One type of reporting is to make available logs for various events detected by the infrastructure service equipment. Such are, for example, the detection of "anomalous" conditions where the types of anomalous conditions are configured), detection of security threats, congestion notification, alerts, etc. These logged events are stored on the log servers 230. The log servers accumulate the raw event information reported by the infrastructure devices, and reporting applications have access to the log servers so that the raw information can be converted into useful reports. Normally because the logging function is traffic intensive, a data center may support multiple log servers to distribute the logging load. Many different logging distribution schemes are possible. A typical log server distribution scheme is to provide one or more log servers within a single data center facility and have the devices only within that facility log to those log servers. It should be recognized that a plurality of different types of log server configurations within the data center are possible while remaining within the scope and content of the present invention.

Administrative Management Hierarchy

In a further unique aspect of the invention, the virtual management system includes an administrative hierarchy allowing different levels of system administrator access to varying levels of configuration and inspection.

Figure 8:
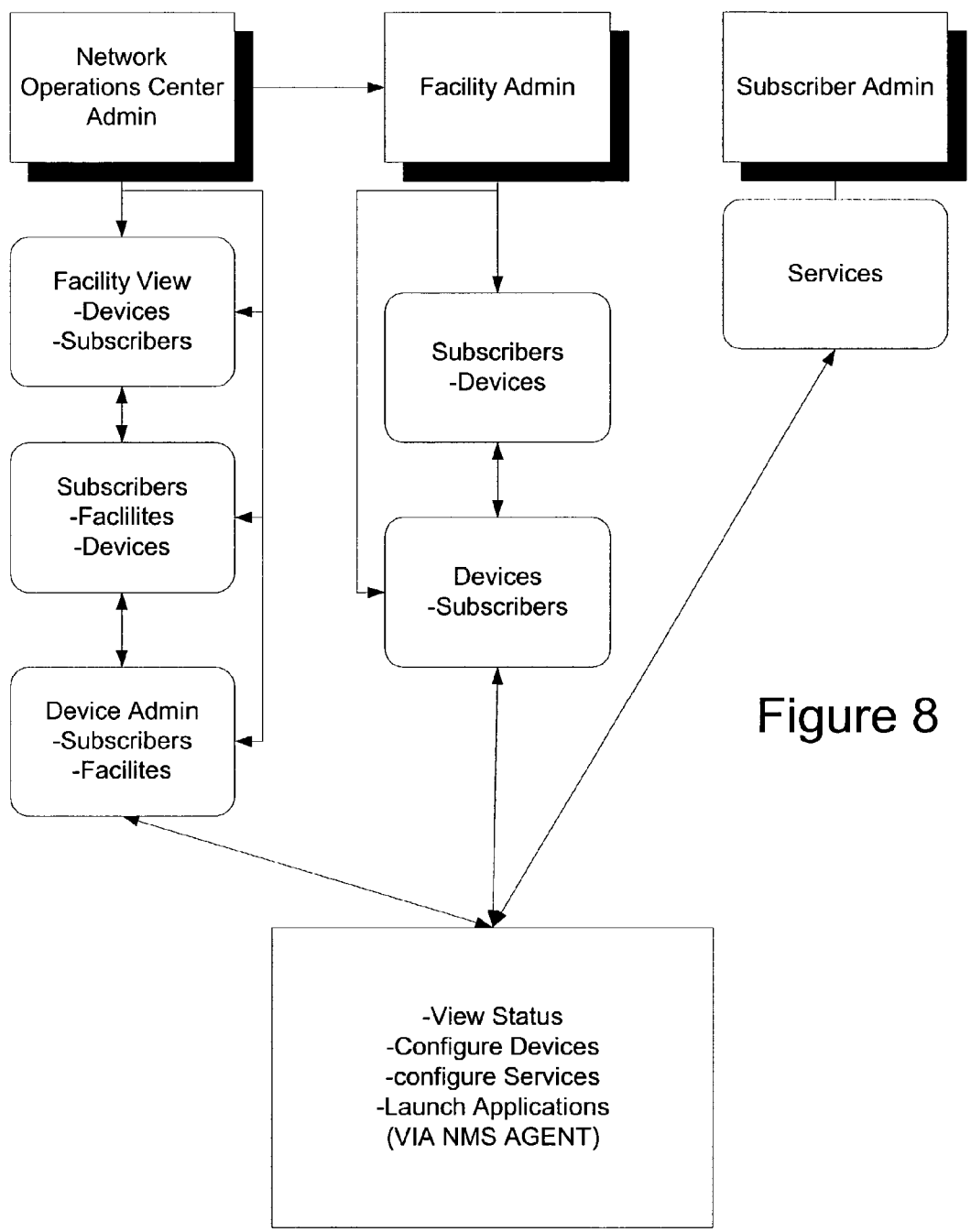
FIG. 8 is a depiction of the administrative management hierarchy utilized in accordance with one embodiment of the system of the invention.

FIG. 8 shows an overview of the administrative management model utilized in the context of the virtual management system of the present invention. The users of the virtualized network management system are called administrators. The administrators that manage these services can be either personnel of the data center or personnel of the subscriber company which contracts with the data center or both. The role that the data center or subscriber administrator plays in managing these services is determined by contractual agreement between subscriber and data center. Thus the virtualized network management system supports both data center and subscriber administrators.

As noted above, there are numerous types of data center administrators, including facility administrators and NOC administrators.

Facility administrators are located at individual facilities of the data center administrative throughout the world. Facility administrators generally have the closest contact with the subscribers that have infrastructure services managed by that facility. Subscriber administrators are personnel that work for the subscriber customer of the data center that have contracted with the data center to manage and/or monitor the management operations pertaining only to that subscriber.

Each type of administrator is given a set of management capabilities. These capabilities are described in terms of management scope and access controls.

The types of objects and the properties of those objects that can be managed by a type of administrator define the management scope of the administrator.

Subscriber administrators are limited to monitoring or modifying management information that pertains only to that subscriber. Although the virtualized management system contains management data for all subscribers, each subscriber administrator manages only his/her part of the management database. The subscriber administrator has no access (neither read or write) to any other subscriber's part of the database.

Since all of the infrastructure equipment, the devices and log servers belong to the data center; the subscriber administrator is prohibited from managing any of the corresponding device and log server topology objects. Also any attributes that pertain to the data center as a whole or to any data center facility are off-limits to the subscriber administrator. The subscriber administrator has potential capability to manage or monitor only the infrastructure services that the subscriber had contracted for with the data center or to receive logging or status reports generated by the infrastructure service equipment.

The facility administrator is limited to the management of only those objects that pertain to his/her data center facility. This means that the facility administrator can manage only the devices and log servers of their data center facility. The facility administrator can manage the infrastructure services of only those subscribers that are hosted on the devices within his/her data center facility. The facility administrator can manage attributes that pertain only to their own facility. For example, the facility administrator can add or delete devices and log servers from the facility. The facility administrator can add or remove subscribers that have services to be hosted only at that facility.

As used in the present model, the NOC administrator has no scope limitations. The NOC administrator can potentially manage or monitor any device, log server, or subscriber service in the entire data center. This capability is potential because it is limited only by the access controls specified for this type of administrator as discussed below.

The administration model allows multiple administrators of any type to concurrently manage the system with each type of administrator limited to their scope. The access may be further limited by any concurrency controls that may be in effect in order to prevent conflicts that corrupt the management database.

Access controls may be assigned to particular administrators. There are many access control schemes however there are some basic concepts that apply to establishing any access control scheme for administrators in the virtualized network management system.

The access control scheme will specify whether the administrator has no access, read access only, or read and write access to any specific part of the management database within the scope of a particular administrator. Write access means that the administrator can make changes to the specified part of the database.

If a specific part of the management database is available in scope to a data center or subscriber administrator, the access controls granted to either the data center or subscriber administrator should be determined by agreement made between subscriber and data center when the subscriber had contracted with the data center. For example if the subscriber had granted the data center exclusive right to configure or modify the infrastructure services contracted for, then only the data center administrators will have write access to these services.

Administrative access controls determine which administrators can create new administrator accounts or can modify or delete existing administrator accounts. Subscriber administrators granted these special privileges can only create, modify, or remove subscriber administrator accounts of administrative personnel working only for that subscriber. Facility administrators having these privileges can manage accounts for administrators only of that facility or of subscribers hosted by that facility. NOC administrators having these privileges can manage administrators from any facility or any subscriber company.

Administrative access controls may determine which data center administrators can modify the virtualization topology within the scope of that administrator. Such privileges give such administrators the right to add or remove devices or log servers or change their properties.

A large number of access control scheme variations are possible. For example write access can be granted to anything within the scope of the administrator. Or write access may be granted only for modifying services for a set of subscribers. Or write access may be granted only for certain services, but not to other services. All such schemes may be incorporated into the virtual management system of the present invention.

Integrated Services

The management system of the present invention allows for an selective services management. That is, all services subscribed to by the user may come under the control of the virtual management system, and subscribers need only contract for those services that are required. For example, subscribers that require only firewall services, but not VPN services need not contract for such services and can save the associated costs of implementing the VPN service.

In addition the centralized nature of the services allows integration of services. Integrated services management allows changes made to one service having an effect on other services provided to the subscriber to immediately propagate to the other services of the subscriber. For example, if a user requires a VPN and that user has also contracted for firewall and NAT services, a change to add the VPN via the virtual management system is integrated with changes to the firewall and NAT servers though the changes made to the VPN application.

More specifically, in implementing a VPN, access though a packet filtering firewall is required. In addition, static mappings in a NAT service allowing users to point a VPN client at a given address for access to the servers of the subscriber are required. In this example, a subscriber level administrator or higher can configure the parameters of the VPN via the VPN service application, by setting for example, the type of authentication used and the IP address of the VPN server, and the VPN service application will communicate with the routing, NAT and firewall applications to map the static IP, allow access to a certain port, such as port 25, for IPSec VPN traffic validation, and thereby enable the VPN for the subscriber while minimizing the cross-configuration of other services normally required in implementing a VPN.

In one embodiment, this is implemented using each content services application. The content services application for the VPN, for example, will search through rules to allow appropriate settings for protocols, such as IPSec and IKE, to pass through a firewall implementation, and change appropriate DNS settings, both of which are implemented by other systems to implement a VPN. Similarly, the VPN application may make changes to NAT settings implemented by the NAT service application In a further implementation, the management system GUI includes a service configuration/policy editor, generally described above, which may be a separate application used to install content services. This is illustrated in FIG. 9. The service configuration/policy editor may be used in the administrator, subscriber or device context to set up services supplied by the multifunction appliance by invoking service rules and pushing down the rules to the NMS server 200.

In one aspect, subscribers configure the services via the service editor, with administrators configuring policies for each subscriber defining which content services are available to that subscriber. Administrators also define objects which serve as the basis for enabling provision of individual services which make up the content services.

For example, in order to implement services using the multifunction appliance, address objects and service objects are first defined, and these objects are used to configure the actual service functions of the multifunction device. As noted above, the service editor can be launched in one of three contexts: Administrator, Device or Subscriber. In one embodiment, the system is provided with a plurality of content services which can be performed by the multifunction device, including, for example, stateful firewall, virtual private networking, quality of service (bandwidth management), network address translation, web switching and secured sockets layer protocol.

By default, the GUI may enable all services for each subscriber, or may be limited to only a subset of the services as defined by the system administrator.

In order to enable individual services, system objects including address objects and service objects are first defined.

Address object may include, for example, a system address, an address range, an address group, a network and a network range. The System administrator may set up address objects for each subscriber. Such objects are then used to configure the services using rules defined by the service editor. An address may identify a host computer; a network could be a complete secured content domain or a subnet of a domain, for example. Address objects can then be grouped as needed to provide services in accordance with the present invention.

Service objects represent individual services that make up content services used by subscribers. For example, a firewall will use any number of individual service objects to control access to a secured domain. The firewall may control access to individual ports of the domain for various services such as Telnet, SSL, SMTP, LDAP, IKE, etc. Each individual service has a service object defined for it. Each service object will include, for example, a name and definition, depending on the service provided. SSL, for example, requires port destinations for the source and destination ports. FTP, requires control and data port definitions, for example. Service objects provide the definitions required for each service to enable the multifunction appliance to perform the service.

Using the service editor, subscribers may use a default set of service objects provided by the administrator, create new objects, or edit existing objects.

Figures 9A, 9B:
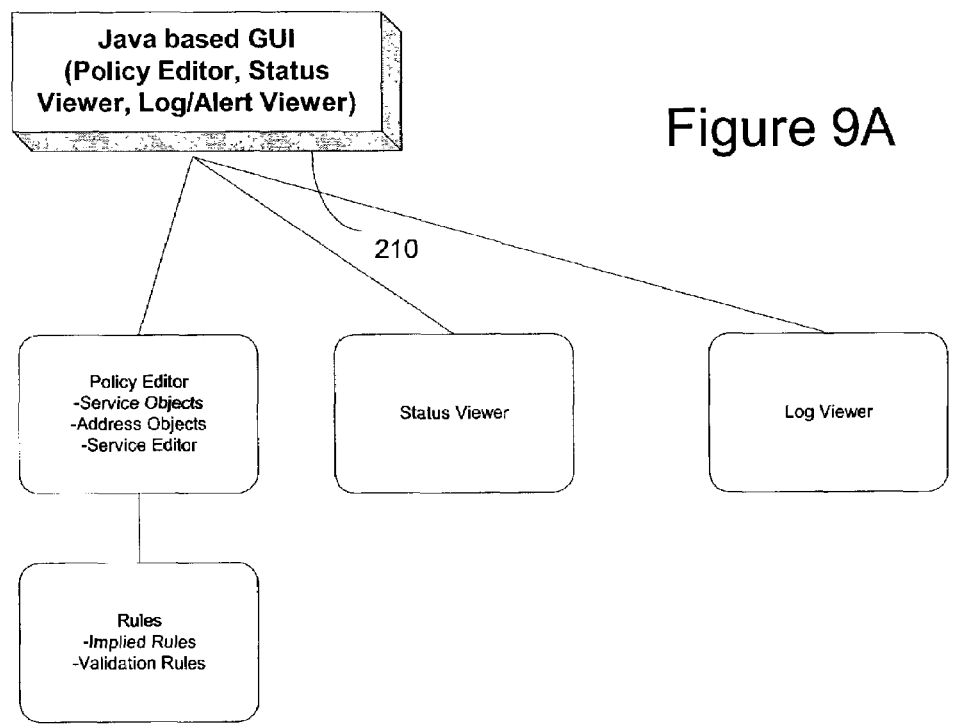
FIG. 9A is a block diagram illustrating the implementation of the GUI interface of the present invention.
FIG. 9B is an exemplary firewall definition representation.

FIG. 9B shows an exemplary configuration screen for a firewall rule. As shown therein, address objects are used to set the source and destination addresses or networks for the rule, and the service object is used to set the type of rule that is implemented on the firewall. It will be understood that the configuration table shown in FIG. 9B is unique to enabling a firewall, and other content services will require different types of configurations.

As shown in FIG. 9A, this integration of service objects and address objects, and the management system of the present invention, enables the provision of implied rule creation amongst various individual services to provide more robust and easily manageable content services. As briefly described above, implementation of the content services by implied rules greatly simplifies service set up by allowing automation of related rule set up when content services functions are to be performed.

In one embodiment, a rule set is enabled via executable objects contained within the GUI embodiment. In this context, the GUI will contain a number of rules which are implied across various individual services when implementing content services, and such implementation will be validated by the NMS server based on the policy implemented for each given subscriber.

The system include implied rules which are implemented in the subscriber context, such as a VPN, SSL, NAT, Firewall, etc., and also includes a set of device-specific default rules for each multifunction appliance in use in the NMS. These rules are associated with "subscriber 0" and generally relate to administrative management functions of the multifunction devices.

For example, default rules implied across all devices coupled to the network management server include defined communication ports and services for the devices and the NMS server.

For a default rule set, an NMS management group object is defined as the NMS server address plus the multifunction device IP address, and the NMS log group as all servers that a multifunction device can log into. Once the address objects are defined, an exemplary default rule set might be as follows:

| PURPOSE | SOURCE | DEST | SERVICE | ACTION |
| --- | --- | --- | --- | --- |
| Allow (secure) control traffic | NMS_MANAGEMENT GROUP | NMS_MANAGEMENT GROUP | HTTPS (or HTTP) | Allow |
|  | DEVICE IP | NMS_MANAGEMENT GROUP | TCP PORT X | Allow |
| SNMP Trap | DEVICE IP | NMS_MANAGEMENT GROUP | SNMP TRAP | Allow |
| Allow Log Server Traffic | DEVICE IP | NMS LOG GROUP | TCP PORT Y | Allow |
| Block all other | Any | Any | Any | DROP |

In order to ensure security, implied rule creation may be disabled for telnet access, SSH access, FTP, Ping, traceroute and SNMP into the appliance itself. The control traffic rule shown in the above table may include either secure or un-secure traffic depending on whether the device is controlled from within a secure environment or over a public network thereby requiring secure traffic.

Still other default implied rules set as default for all subscribers could be to allow pings and trace routes to IP addresses owned by the multifunction appliance and assigned to individual subscribers.

An example of an implied rule run in the VPN context might look like the following table. A subscriber could implement the rules by accessing a VPN setup screen in the service editor selecting a VPN option, and the services listed in the table are thereafter installed. Note that in one embodiment, the rules provide the service, but each service may still be configured. For example, configuration of IPSec would allow configuration of the type of encoding and shared keys.

In the aforementioned example, the implied rules for a VPN would constitute the following:

Yet another example of an implied rule set is the use of a "mesh" VPN. In the aforementioned VPN example, a point-to-point VPN is assumed. That is, a VPN is designated from a single IP or group to another IP or group. A mesh VPN is useful where, for example, a subscriber has multiple offices (multiple IPs or groups) coupled to a public network, all of which need to establish point-to-point connections with each other. Performing this rule making manually would be tedious and time consuming. However, using a rule set and a VPN configuration applet, the subscriber can set up each address object used in the mesh VPN and the rule set can establish the point-to-point VPNs between each of the offices (objects) automatically.

In addition, subscribers and administrators can be provided with the option of allowing implied rules to be turned off.

Yet another feature that may be implemented in conjunction with the implied rule set involves automatic NAT and by-pass NAT. Auto-NAT can be a feature that may be toggled on or off by the user to enable NAT translation rules to be propagated to any service installed in the subscriber context. NAT translations can be one-to-one or many-to-one (also referred to as hide mode or hide NAT). In one embodiment, for example, where the address object identifies a single workstation or server, this is implemented by installing static source and static destination mapping rules:

| PURPOSE | SOURCE | DEST | SERVICE | ACTION |
| --- | --- | --- | --- | --- |
| allow IKE traffic to tunnel termination address | tunnel termination address | peer group address | IKE | Allow |
| sloe ivmp traffic to and from tunnel termination address | tunnel termination address | any | icmp | Allow |
|  | any | tunnel termination address | ICMP | Allow |
| allow secure and non-secure LDAP traffic from tunnel-termination address | tunnel termination address | any | LDAP | Allow |
|  | tunnel termination address | any | secure LDAP | Allow |
| allow secure and non-secure HTTP traffic from the tunnel-termination address | tunnel termination address | any | HTTP | Allow |
|  | tunnel termination address | any | HTTPS | Allow |
| Allow DNS resolution from tunnel-termination address | tunnel termination address | any | DNS | Allow |

| Source | Destination | Service | Source | Destination | Service |
|---|---|---|---|---|---|
| Internal-Device | Any | Any | External-Device(Static) | Original | Original |
| Any | External-Device | Any | Original | Internal-Device (Static) | Original |

For cases involving networks, address ranges, or network ranges, there may be three rules, the two static translation rules mentioned above as well as a rule mapping all services:

| Source | Destination | Service | Source | Destination | Service |
|---|---|---|---|---|---|
| Internal-Device | Internal-Device | Any | Original | Original | Original | and for hide-mode NAT, the following third rule:

| Source | Destination | Service | Source | Destination | Service |
|---|---|---|---|---|---|
| Internal-Devices | Any | Any | External-Hide(Hide) | Original | Original |

Still another feature that may be implemented in this context is a NAT bypass. A rule may be placed in the NAT table to by-pass other NAT rules in the case that a subscriber wants to by-pass addresses or ranges that are normal subject to NAT rules for a particular service.

As noted above numerous variations on the virtual management system of the present invention are possible without departing from the scope and context of the invention. While the invention has been described with respect to managing multi-function service devices, the virtual management system of the present invention may be utilized to manage single function devices as well. In such a variation, the devices must incorporate some form of the management back plane application in order to configure the services of the device.

Yet other variations include the presentation of the management interface to system administrators. Command line interfaces are supported, including interfaces which mimic commands from popular third party configurations of companies who make single function service provision products. In addition, the GUI itself may have a different configuration than the Tree-style configuration set forth herein, and the manner in which the GUI is supported on the management interface—be it a non-specific port of platform independent code, a platform specific embodiment, or an application designed to run in a host browser—are all within the scope and context of the present invention.

Numerous other variations of the invention are mentioned herein. The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A network administration system for configuring a data center that provides network content services to a plurality of subscribers of different companies, the network administration system comprising:
   an administration server comprising:
      (i) a plurality of service objects having object properties that provide network service definitions for the network services provided by the data center to the subscribers of the different companies,
      (ii) a plurality of address objects having object properties that define address information for the network services provided by the data center to the subscribers; and
      (iii) a plurality of sets of implied rules, wherein each one of the sets of implied rules defines a configuration of one of the network content services, wherein each rule in the set of implied rules comprises at least one of the service objects and at least one of the address objects; and
   a client computer executing a configuration engine that presents a user Interface, wherein the user interface allows the subscriber to configure a respective subset of the network services provided by the data center,
   wherein, in response to a configuration change to a first one of the network content services by one of the subscribers, the configuration engine automatically modifies an address object or a service object of a rule in the set of implied rules that defines the configuration of the first one of the network content services,
   wherein, at least one rule in the set of implied rules defines configuration of a second one of the network content services and includes the modified address object or service object, and
   wherein the configuration engine automatically modifies a configuration of the first one of the network content services and automatically modifies a configuration of the second one of the network content services when the modification to the address object or the service object is reflected in all rules in the sets of implied rules that include the modified address object or the modified service object.

2. The network service administration system of claim 1 wherein said network content services include at least one of the following: Network address translation; virtual private networking; OSPF routing; Load balancing or Firewall.

3. The network service administration system of claim 1 wherein the implied rules include a default rule set allowing administrative management of the network services provided by the data center.

4. The network service administration system of claim 1 wherein a subset of the network content services are applied to subscriber data.

5. The network service administration system of claim 1 wherein each of said service objects comprises an individual network service definition.

6. The network service administration system of claim 5 wherein each of said services defined by said service objects may be configured by the service configuration application.

7. The network service administration system of claim 5 wherein each of said service definitions may be edited by said service configuration application by changing the object properties of the service objects or the address objects.

8. The network service administration system of claim 1 wherein said set of implied rules are enabled only to the network content services associated with the subscriber issuing the configuration change.

9. The network service administration system of claim 1 wherein said network content services includes a point-to-point VPN.

10. The network service administration system of claim 9 wherein said sets of implied rules include a mesh VPN rule allowing definition of a plurality of point-to-point VPNs based on specification of the plurality of address objects.

11. A rule-based network administration system for a data center that provides a plurality of content services to at least one subscriber coupled to a network, comprising:
 a service policy for each of the content services, wherein the service policy is associated with said at least one subscriber;
 a plurality of service objects, wherein each of the service objects defines a network service; and
 a configuration engine including a plurality of content service rule sets, wherein each one of the content service rule sets defines a configuration for one of the content services, wherein each rule in the content service rule sets includes one or more of the service objects,
 wherein, in response to a change of the service policy by the subscriber, the configuration engine automatically modifies a service object in said plurality of service objects such that the modified service object is compatible with the change to the service policy,
 wherein, a rule in the set of implied rules that defines the configuration of a second one of the content services includes the modified service object,
 wherein, the configuration engine modifies a configuration the first one of the content services and automatically modifies a configuration of the second one of the content services when a modification to a service object is reflected in all rules in the plurality of rule sets that include the service object.

12. The rule-based network administration system of claim 11 wherein the configuration engine operates in a subscriber context to apply rules for network data associated with one subscriber.

13. The ruled-based network administration system of claim 12 wherein the configuration validates configured service applications based on each rule set with said service policy associated with said subscriber.

14. The rule-based network administration system of claim 11 wherein said content service application rule sets include sets for at least one of the following: Network address translation; virtual private networking; OSPF routing; Load balancing; or Firewall.

15. The rule-based network administration system of claim 11 further including a plurality of address objects that represents a set of network addresses associated with the content service application provided by the data center.

16. The rule-based network administration system of claim 15 wherein said rule sets utilize said address object in defining said content service applications.

17. The rule-based network administration system of claim 15 wherein said address object comprises at least one of: a system address, an address range, an address group, a network and a network range.

18. The rule-based network administration system of claim 11 wherein the data center is coupled to process data traffic for a plurality of subscribers and said rule sets are applied to individual ones of said subscribers.

19. A rule-based network administration system for a data center that provides a plurality of content services to at least one subscriber, comprising:
 a service policy for each of the content services, wherein the service policy is associated with said at least one subscriber;
 a plurality of service definitions, wherein each one of the service definitions defines a network service; and
 a means for automatically modifying, in response to a change of the service policy by the subscriber, a service definition in said plurality of service definitions such that the modified service definition is compatible with the change to the service policy,
 wherein the means includes a plurality of content service rule sets, wherein each one of the content service rule sets defines a configuration for one of the content services, wherein each rule in the content rules rule sets includes one or more of the service definitions,
 wherein, a rule in the set of implied rules that defines a configuration of a second one of the content services includes the modified service definitions,
 wherein, the modifying means automatically modifies a configuration of the first one of the content services and automatically modifies a configuration of the second one of the content services when a modification to a service definition is reflected in all rules in the plurality of rule sets that include the service definition.

20. The implied rule network administration system for a data center of claim 19 wherein said first one of the content service applications comprises at least one of the following: Network address translation; virtual private networking; OSPF routing; Load balancing; or Firewall.

21. The implied rule network administration system for a data center of claim 19 wherein the means includes a default rule set allowing administrative management of the data center.

22. The implied rule network administration system for a data center of claim 19 wherein the means is provided on a client computer coupled via a network to the data center.

23. The implied rule network administration system for a data center of claim 22 further including an network management server coupled between the means and the data center, and including subscriber policies.

* * * * *